(12) United States Patent
McMahon et al.

(10) Patent No.: US 10,298,113 B2
(45) Date of Patent: May 21, 2019

(54) FILTER FOR A POWER NETWORK

(71) Applicant: HTIP Limited, Cambridge (GB)

(72) Inventors: Richard McMahon, Cambridge (GB); Thomas George Logan, Cambridge (GB)

(73) Assignee: HTIP Limited, Camebridge (GB)

(*) Notice: Subject to any disclaimer, the term of this patent is extended or adjusted under 35 U.S.C. 154(b) by 0 days.

(21) Appl. No.: 15/442,432

(22) Filed: Feb. 24, 2017

(65) Prior Publication Data
US 2018/0248491 A1 Aug. 30, 2018

(51) Int. Cl.
H02M 1/12 (2006.01)
H02M 5/04 (2006.01)
H02M 1/44 (2007.01)

(52) U.S. Cl.
CPC .............. *H02M 1/126* (2013.01); *H02M 1/44* (2013.01); *H02M 5/04* (2013.01); *H02M 2001/123* (2013.01)

(58) Field of Classification Search
CPC .................................. H02M 1/44; H02M 5/06
USPC ...................................................... 363/39–47
See application file for complete search history.

(56) References Cited

U.S. PATENT DOCUMENTS

| 564,698 A | 7/1896 | Kennedy | |
|---|---|---|---|
| 2002/0195973 A1 | 12/2002 | Hu et al. | |
| 2005/0063205 A1* | 3/2005 | Stancu | H02M 7/53875 363/132 |
| 2006/0227483 A1* | 10/2006 | Akagi | H02M 1/12 361/118 |
| 2007/0139849 A1* | 6/2007 | Beil | H02H 9/005 361/118 |
| 2013/0069615 A1* | 3/2013 | Choi | H02M 1/44 323/304 |
| 2013/0229838 A1 | 9/2013 | Wang et al. | |
| 2013/0241290 A1* | 9/2013 | Higuchi | H02M 1/126 307/52 |
| 2016/0241153 A1* | 8/2016 | Abeyasekera | H02M 7/493 |
| 2016/0268919 A1* | 9/2016 | Halberstadt | H02M 1/42 |

FOREIGN PATENT DOCUMENTS

| CN | 104638906 A | 5/2015 |
|---|---|---|
| JP | 2013106475 A | 5/2013 |

* cited by examiner

Primary Examiner — Jue Zhang
Assistant Examiner — Bart Iliya
(74) Attorney, Agent, or Firm — Stetina Brunda Garred and Brucker; Mark B. Garred

(57) ABSTRACT

A filter for a power converter provided in-line with at least one live line of a power network. The filter has an input section with an input inductance provided at an input of the power converter and an output section with an output inductance provided at an output of the power converter. A neutral inductance provided between the power converter and a neutral line of the power network such that the neutral inductance is not in-line with the neutral line of the power network. The neutral inductance is shared by the input section and the output section.

17 Claims, 5 Drawing Sheets

FILTER FOR A POWER NETWORK

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to filters in power networks. The invention is particularly suitable for use as a filter for a device such as a power converter provided in-line with at least one live line of an AC power network.

2. Background and Prior Art

Power networks distribute electrical energy from generation stations to consumers. Typically, power networks distribute poly-phase AC electrical energy, with three phases being the most common.

The use of power converters in power networks is being considered to improve the efficiency of the power network. Power converters for power networks are typically switch-mode converters for efficiency. Switch-mode converters are known to produce high levels of undesirable noise on both the input and output of the converter due to the high frequency switching involved in switch-mode designs. Filters are required on the input and output of such power converters for electromagnetic compatibility (EMC) compliance: ensuring the power converter both draws clean power from its supply and provides clean power to loads connected downstream of it. Power converters may require both a differential mode filter and a common mode filter to be compliant with EMC regulations.

Power converters for power networks must also provide a neutral to downstream loads, leading to the additional requirement of providing a clean neutral line that is EMC compliant.

FIG. 1 shows conventional common mode filters 1, 2 provided at the input and output of a power converter 3, respectively. Each filter 1, 2 includes inductors 4 provided in-line with live lines L1-L3 and neutral line N. The inductors 4 of filter 1 are wound on a common core, and the inductors 4 of filter 2 are wound on a separate common core.

FIG. 2 shows conventional differential mode filters 5, 6 provided at the input and output of a power converter 3, respectively. Again, each filter 5, 6 includes inductors 7 provided in-line with live lines L1-L3 and neutral line N.

A disadvantage of these conventional filters is that the neutral current must pass through inductors on the neutral lines, adding cost to the filter and increasing the insertion loss of the filter. Low insertion loss is desirable for filters used in applications where circuit protection equipment is used; low loop impedance (live+neutral line impedance) is desirable where circuit breakers are employed. In protective multiple earth systems the neutral and earth lines are generally combined in the distribution network and are separated at consumer end. In such systems it is desirable to have the minimum impedance in the neutral line of the distribution network: impedance in the neutral line will be increasing the earth impedance as well, which can reduce safety of the electrical network.

BRIEF SUMMARY

In accordance with a first aspect of the invention there is provided a filter for a power converter provided in-line with at least one live line of a power network, comprising: an input section having a first input inductance provided at an input of the power converter; an output section having a first output inductance provided at an output of the power converter; a first neutral inductance provided between the power converter and a neutral line of the power network; wherein the first neutral inductance is shared by the input section and the output section.

Preferably, the input section includes a second input inductance in series with the first input inductance, the output section includes a second output inductance in series with the first output inductance; and a second neutral inductance is provided in series with the first neutral inductance whereby the second neutral inductance is shared by the input section and the output section.

Preferably, the first input inductance, the first output inductance and the first neutral inductance are configured as a common-mode filter.

Preferably, the first input inductance, the first output inductance and the first neutral inductance are coupled. More preferably, the first input inductance, the first output inductance and the first neutral inductance are wound on a common core.

Preferably, the second input inductance, the second output inductance and the second neutral inductance are configured as a differential-mode filter.

Preferably, the first and second neutral inductances are not in-line with the neutral line of the power network.

In accordance with a first aspect of the invention there is provided a filter for a power converter provided in-line with at least one live line of a power network, the filter having input and output sections with inductances in-line with the at least one live line, characterized by: a filter neutral terminal for connection to a neutral line of the power network; at least one inductor selected from the set consisting of: a common-mode inductor provided between the power converter and the filter neutral terminal; a differential-mode inductor provided between the power converter and the filter neutral terminal; wherein the at least one inductor is not in-line with the neutral line of the power network.

Preferably, the least one inductor is shared by the input and output sections.

BRIEF DESCRIPTION OF THE DRAWINGS

The invention will now be described with reference to the accompanying drawings, in which.

DETAILED DESCRIPTION

The embodiment will be described in relation to filtering noise produced by a power converter provided in-line with live lines in a power network. It will be understood by a skilled addressee that in other embodiments, the invention may be used with devices other than power converters, and that the filter may be used in power networks having greater or fewer than three live lines.

Figure 1:
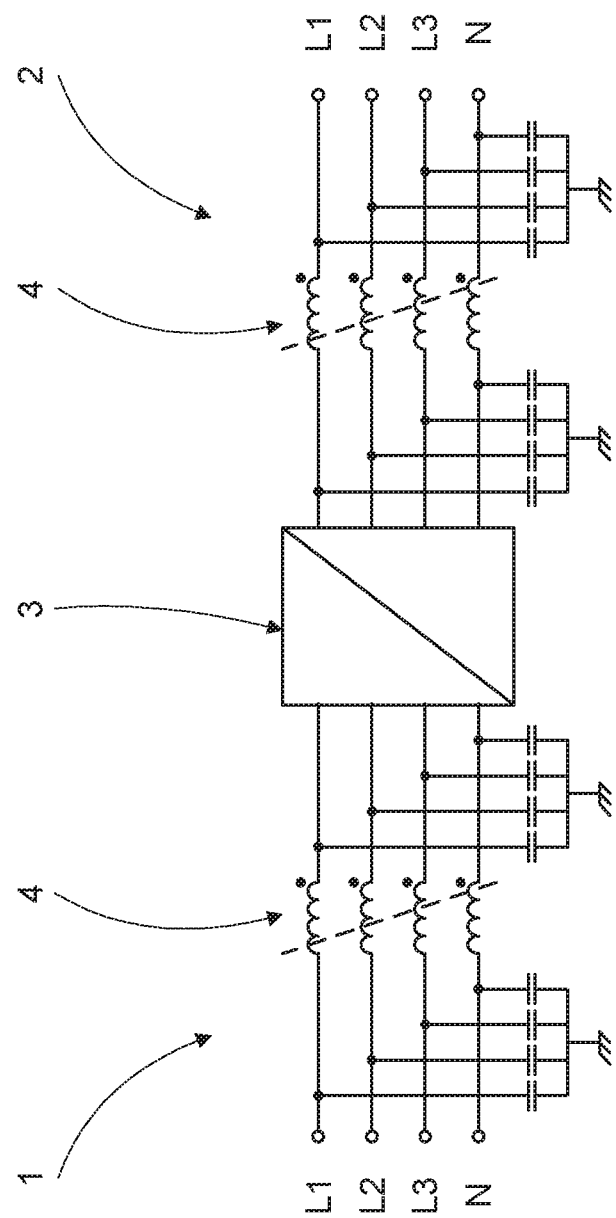
FIG. 1 shows a conventional common mode filter.
Figure 2:
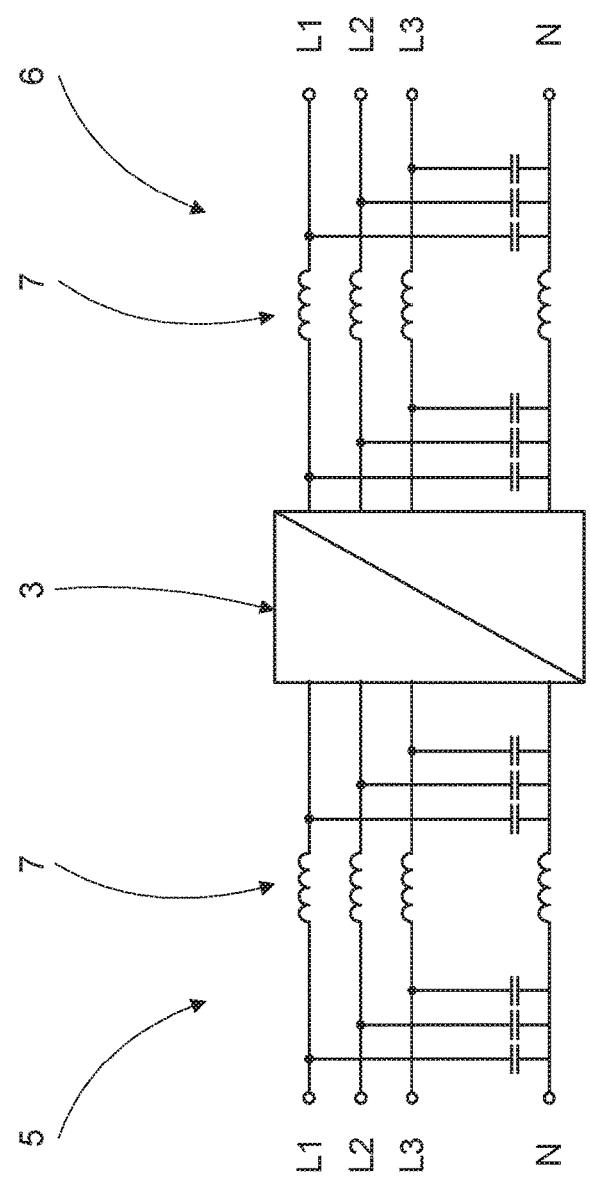
FIG. 2 shows a conventional differential mode filter.
Figure 3:
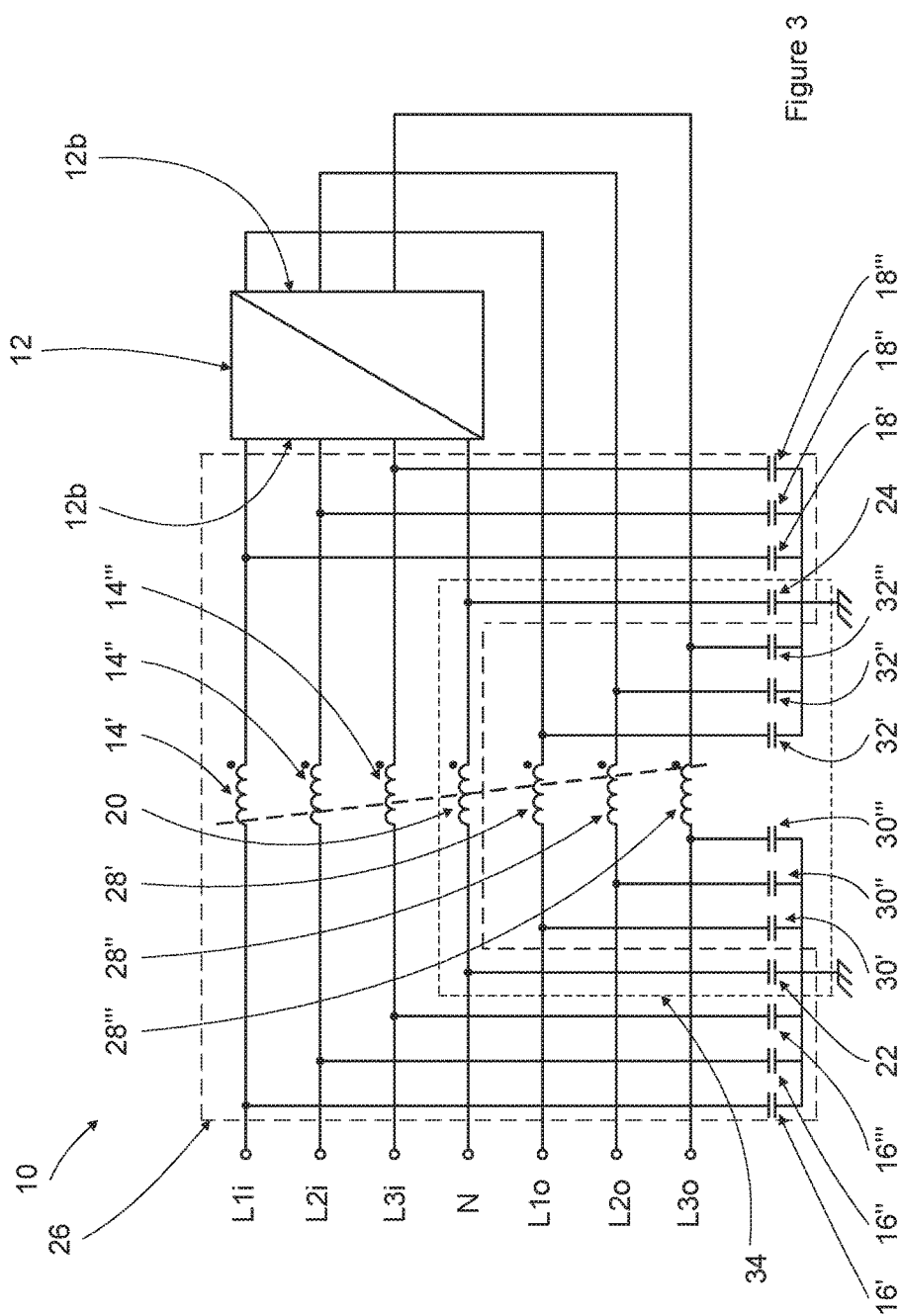
FIG. 3 shows a common mode filter according to an embodiment of the invention.

FIG. 3 shows a common mode filter 10 of the embodiment for a power converter 12 provided in-line with an AC power network having three live lines. The filter 10 has input terminals L1$i$, L2$i$ and L3$i$ for connection to live line input feeds, output terminals L1$o$, L2$o$ and L3$o$ for connection to live line output feeds, and a neutral terminal N for connection to a neutral line of the power network.

The filter 10 has three input inductors 14', 14", and 14"', three input capacitors 16', 16", 16"', and a further three input capacitors 18', 18" and 18"'. The input inductor 14' and input capacitors 16', 18' are configured as a pi-filter between input terminal L1$i$ and an input 12$a$ of the power converter 12. Similarly, the input inductor 14" and input capacitors 16", 18" are configured as a pi-filter between input terminal L2$i$ and the input 12$a$ of the power converter 12; the input inductor 14"' and input capacitors 16"', 18"' are configured as a pi-filter between input terminal L3$i$ and the input 12$a$ of the power converter 12.

The filter 10 includes an inductor provided between the neutral terminal N and the power converter 12, referred to hereafter as a neutral inductor 20. A neutral capacitor 22 and a further neutral capacitor 24 are configured with the neutral inductor 20 to form a pi filter between the neutral terminal N and the power converter.

The input inductors 14, input capacitors 16, 18, neutral inductor 20 and neutral capacitors 22, 24 form an input section 22 of the filter 10.

The filter 10 further includes three output inductors 28', 28", and 28"', three output capacitors 30', 30", 30"', and a further three output capacitors 32', 32" and 32"'. The output inductors 28 and capacitors 30, 32 are configured to form pi filters between the output terminals L1$o$, L2$o$ and L3$o$ and an output 12$b$ of the power converter 12 in like manner to that described above for the input inductors 14 and input capacitors 16, 18.

The output inductors 14, output capacitors 16, 18, neutral inductor 20 and neutral capacitors 22, 24 form an output section 34 of the filter 10.

The input inductors 14, neutral inductor 20 and output inductors 28 of the filter 10 are coupled to reject common-mode noise. Preferably, the input inductors 14, neutral inductor 20 and output inductors 28 are all wound on a common core.

The neutral inductor 20, along with the neutral capacitors 22, 24 and the pi filter formed by these components, are shared by the input section 26 and output section 34, reducing the number of inductors and capacitors required by the filter compared to conventional filters.

The filter 10 is intended to be connected to a power network in-line with the live lines, such that current on the live lines passes from input terminals L1$i$, L2$i$ and L3$i$ to output terminals L1$o$, L2$o$ and L3$o$ through the input section 26 of the filter 10, the power converter 12 and the output section 34 of the filter 10.

The neutral terminal N of the filter 10 is not designed to be connected in-line with the neutral line of the power network: instead the neutral terminal N is designed to be simply connected to the neutral line of the power network to provide a neutral connection to the power converter 12. Noise from the power converter is attenuated by the input and output sections 26, 34, respectively. In the case of the neutral line, the pi filter formed from the neutral inductor 20 and neutral capacitors 22, 24 between the neutral terminal N and the power converter 12 provides attenuation of noise from the power converter. Configuring the filter 10 in this way avoids providing inductance in the neutral line of the power network which would increase the insertion loss of the filter while still providing attenuation of noise from the power converter 12.

Further, the configuration of the filter 10 enables the neutral inductor 20 to be designed to pass a smaller current than would otherwise be required if the neutral inductor 20 was provided in-line with the neutral line of the power network, particularly in embodiments where the filter is intended for a single live line or where a multi-phase power network is unbalanced so that significant current flows through the neutral line of the power network.

Figure 4:
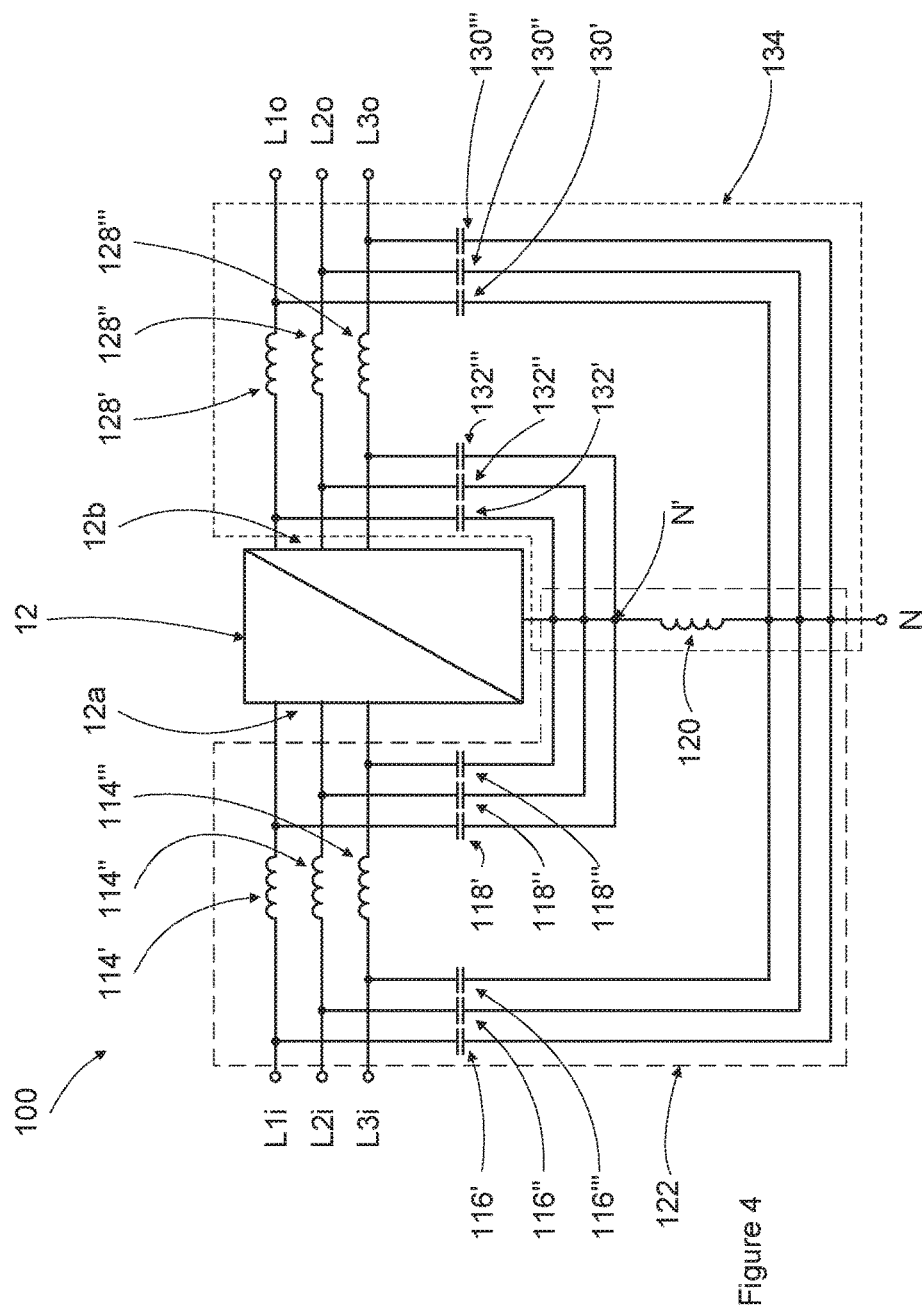
FIG. 4 shows a differential mode filter according to an embodiment of the invention.

FIG. 4 shows a differential mode filter 100 of the embodiment for a power converter 12 provided in-line with an AC power network having three live lines. The filter 100 has input terminals L1$i$, L2$i$ and L3$i$ for connection to live line input feeds, output terminals L1$o$, L2$o$ and L3$o$ for connection to live line output feeds, and a neutral terminal N for connection to a neutral line of the power network.

The filter 100 includes an inductor, referred to hereafter as neutral inductor 120, provided between the neutral terminal N and a neutral connector N' of the power converter 12.

The filter 100 has three input inductors 114', 114", and 114"', three input capacitors 116', 116", 116"', and a further three input capacitors 118', 118" and 118"'.

The input inductor 114' is provided between input terminal L1$i$ and the input 12$a$ of the power converter. The input capacitor 116' is provided between input terminal L1$i$ and the neutral terminal N. The further input capacitor 118' is provided between input inductor 114' at the end thereof connected to the input 12$a$ and the neutral connector N'. In this configuration, the input inductor 114', input capacitors 116', 118' together with the neutral inductor 120 form a balanced pi-filter between input terminal L1$i$ and neutral terminal N and input 12$a$ and neutral connector N' of the power converter 12.

In like manner, input inductor 114", input capacitors 116", 118" together with the neutral inductor 120 form a balanced pi filter between input terminal L2$i$ and neutral terminal N and input 12$a$ and neutral connector N' of the power converter 12. Similarly input inductor 114"', input capacitors 116"', 118"' together with the neutral inductor 120 form a balanced pi-filter between input terminal L3$i$ and neutral terminal N and input 12$a$ and neutral connector N' of the power converter 12.

The input inductors 114, input capacitors 116, 118, and neutral inductor 120 form an input section 122 of the filter 110.

The filter 110 further includes three output inductors 128', 128", and 128"', three output capacitors 130', 130", 130"', and a further three output capacitors 132', 132" and 132"'. The output inductors 128 and capacitors 130, 132 together with the neutral inductor 120 are configured to form balanced pi filters between the output terminals L1$o$, L2$o$ and L3$o$ and an output 12$b$ of the power converter 12 in like manner to that described above for the input inductors 114 and input capacitors 116, 118 and neutral inductor 120.

The output inductors 114, output capacitors 116, 118, neutral inductor 120 form an output section 134 of the filter 100.

In the filter 100, the neutral inductor 120 is shared by the input section 126 and output section 134, reducing the number of inductors required by the filter compared to conventional filters.

The filter 100 is intended to be connected to a power network in-line with the live lines, such that current on the live lines passes from input terminals L1$i$, L2$i$ and L3$i$ to output terminals L1$o$, L2$o$ and L3$o$ through the input section 26 of the filter 10, the power converter 12 and the output section 34 of the filter 10. The neutral terminal N of the filter 10 is designed to be connected to the neutral line of the power network to provide a neutral connection to the power converter 12 without inserting inductance into the neutral line of the power network.

Figure 5:
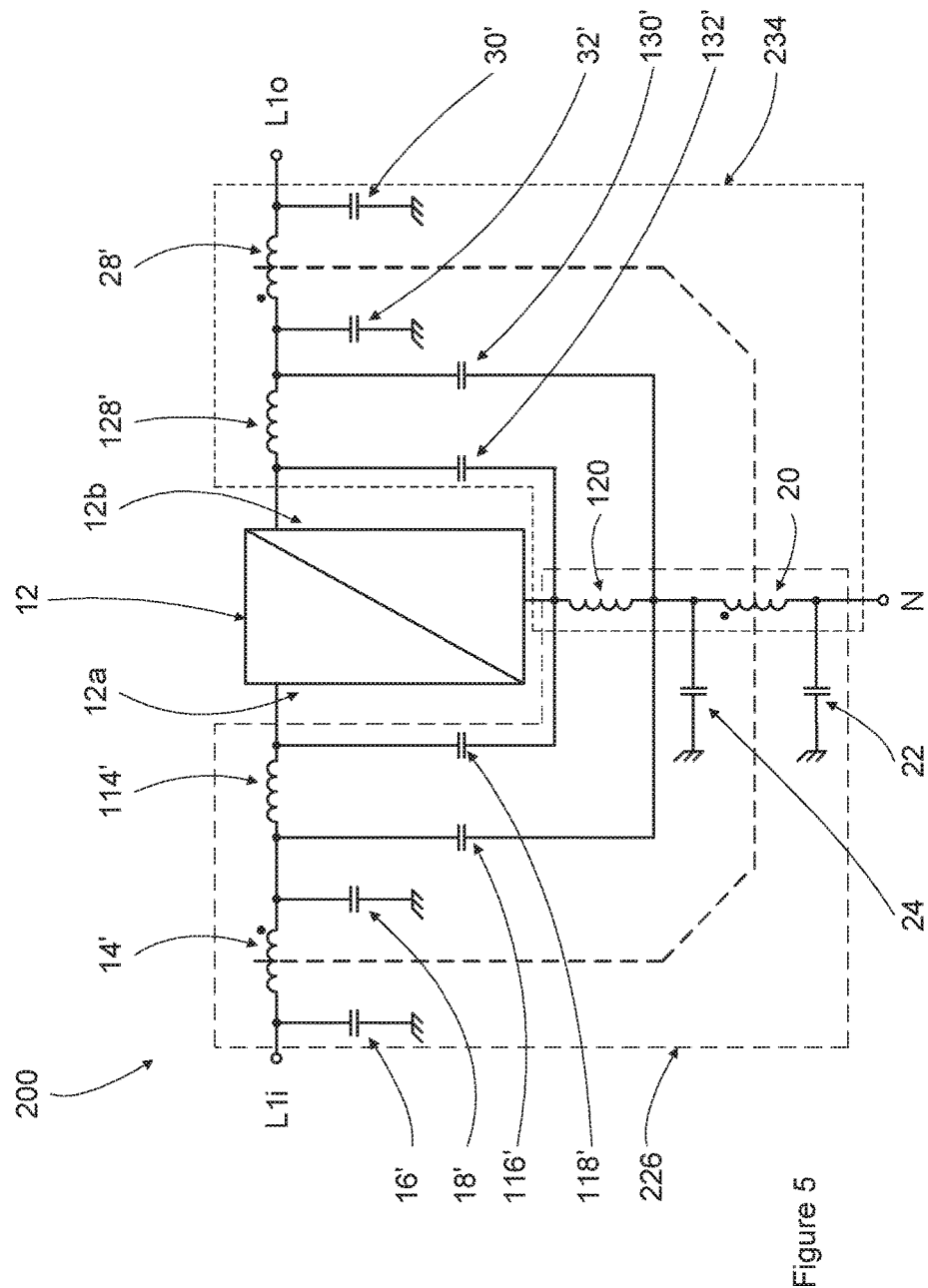
FIG. 5 shows a combined common and differential mode filter according to an embodiment of the invention.

The filter 100 provides differential mode filtering of noise from the power converter 12, such that noise therefrom is filtered from the neutral line, live input lines and live output lines of the power network. In like manner to that described above in relation to filter 10, configuring the filter 100 in this way avoids insertion losses from inductances in-line with the neutral line of the power network and enables the neutral inductor 120 to be designed to pass a smaller current than would otherwise be required.

Where both common mode and differential mode filtering of a device such as a power converter is required, the filters 10, 100 may be combined in either order: the rectangular block 12 in FIG. 3 could contain the whole of the circuit of FIG. 4, or vice versa. FIG. 5 shows an example of such a combined filter. For clarity of the drawing, FIG. 5 shows such a filter for a single live line.

The filter 200 of FIG. 5 uses like reference numerals to denote like parts to those in FIGS. 3 and 4. As shown, combining the filters 10 and 100 to form filter 200 results in two inductances being in series at the input 12$a$ and output 12$b$ of the power converter, one of which is configured as a common mode filter and the other as a differential mode filter. In addition, two inductances are provided in series between the power converter 12 and the neutral terminal N: neutral inductor 20 being a common-mode inductor and neutral inductor 120 being a differential mode inductor.

The filter 200 includes input section 226 and output section 234 which share the neutral inductors 20, 120.

More stages could be added to each filter if desired, however for clarity low-order filters are shown.

Modifications and variations such as would be apparent to a person skilled in the art are within the scope of the invention, as defined in the following claims.

What is claimed is:

1. A filter for an AC to AC power converter provided in-line with at least one live line of an AC power network, comprising:
   an input section having a first input inductance provided between an input of the power converter and a filter live line output;
   an output section having a first output inductance provided between an output of the power converter and a filter live line output;
   a first neutral inductance provided between the power converter and a neutral line of the power network;
   wherein the first neutral inductance is shared by the input section and the output section.

2. The filter of claim 1, wherein the first input inductance, the first output inductance and the first neutral inductance are configured as a common-mode filter.

3. The filter of claim 2, wherein the first input inductance, the first output inductance and the first neutral inductance are coupled.

4. The filter of claim 3, wherein the first input inductance, the first output inductance and the first neutral inductance are wound on a common core.

5. The filter of claim 1, wherein:
   the input section includes a second input inductance in series with the first input inductance;
   the output section includes a second output inductance in series with the first output inductance; and
   a second neutral inductance is provided in series with the first neutral inductance whereby the second neutral inductance is shared by the input section and the output section.

6. The filter of claim 5, wherein the first input inductance, the first output inductance and the first neutral inductance are configured as a common-mode filter.

7. The filter of claim 5, wherein the second input inductance, the second output inductance and the second neutral inductance are configured as a differential-mode filter.

8. The filter of claim 5, wherein the first and second neutral inductances are not in-line with the neutral line of the power network.

9. The filter of claim 6, wherein the first input inductance, the first output inductance and the first neutral inductance are coupled.

10. The filter of claim 6, wherein the second input inductance, the second output inductance and the second neutral inductance are configured as a differential-mode filter.

11. The filter of claim 6, wherein the first and second neutral inductances are not in-line with the neutral line of the power network.

12. The filter of claim 9, wherein the first input inductance, the first output inductance and the first neutral inductance are wound on a common core.

13. The filter of claim 9, wherein the second input inductance, the second output inductance and the second neutral inductance are configured as a differential-mode filter.

14. The filter of claim 9, wherein the first and second neutral inductances are not in-line with the neutral line of the power network.

15. The filter of claim 12, wherein the second input inductance, the second output inductance and the second neutral inductance are configured as a differential-mode filter.

16. The filter of claim 12, wherein the first and second neutral inductances are not in-line with the neutral line of the power network.

17. A filter for an AC to AC power converter provided in-line with at least one live line of an AC power network, the filter having input and output sections for connection to respective input and output sides of said power converter, each with inductances in-line with the at least one live line, characterized by: a filter neutral terminal for connection to a neutral line of the power network; at least one inductor selected from the set consisting of: a common-mode inductor provided between the power converter and the filter neutral terminal; and a differential-mode inductor provided between the power converter and the filter neutral terminal; wherein the at least one inductor is not in-line with the neutral line of the power network; wherein the at least one inductor is shared by the input and output sections.

* * * * *